United States Patent
Yuan et al.

(10) Patent No.: US 11,332,589 B2
(45) Date of Patent: May 17, 2022

(54) PREPARATION METHOD FOR SURFACE MOLDING FILM OF PVC-BASED STONE PLASTIC COMPOSITE BOARD

(71) Applicant: Shaanxi University of Technology, Hanzhong (CN)

(72) Inventors: Xinqiang Yuan, Hanzhong (CN); Jing Mei, Hanzhong (CN); Kun Zhang, Hanzhong (CN); Chen Zeng, Hanzhong (CN); Taotao Ai, Hanzhong (CN); Jinhu Dong, Hanzhong (CN); Yanzhuo Ma, Hanzhong (CN)

(73) Assignee: SHAANXI UNIVERSITY OF TECHNOLOGY, Hanzhong (CN)

( * ) Notice: Subject to any disclaimer, the term of this patent is extended or adjusted under 35 U.S.C. 154(b) by 648 days.

(21) Appl. No.: 16/390,055

(22) Filed: Apr. 22, 2019

(65) Prior Publication Data
US 2020/0071478 A1    Mar. 5, 2020

(30) Foreign Application Priority Data
Aug. 28, 2018   (CN) .......................... 201810990020.6

(51) Int. Cl.
| | | |
|---|---|---|
| *C08J 7/16* | (2006.01) | |
| *C08J 7/04* | (2020.01) | |
| *C09D 5/33* | (2006.01) | |
| *C09D 133/12* | (2006.01) | |
| *C08K 3/22* | (2006.01) | |

(52) U.S. Cl.
CPC ............... *C08J 7/16* (2013.01); *C08J 7/0427* (2020.01); *C09D 5/004* (2013.01); *C09D 133/12* (2013.01); *C08J 2327/06* (2013.01); *C08J 2333/12* (2013.01); *C08K 2003/2241* (2013.01)

(58) Field of Classification Search
CPC ............................... B29C 67/248; C08J 7/042
See application file for complete search history.

*Primary Examiner* — Alex A Rolland
(74) *Attorney, Agent, or Firm* — IP Attorneys Group, LLC

(57) ABSTRACT

The present invention discloses a preparation method for a surface molding film of a PVC-based stone plastic composite board, including: surface activation treatment of the PVC-based stone plastic composite board: preparation of an activated putty, coarse roughening of a substrate surface, application and solidification of the activated putty, and fine roughening of the substrate surface; preparation of a PMMA slurry; and surface film forming of the PVC-based stone plastic composite board. The PVC-based stone plastic composite board coated with a PMMA film is obtained by cold pressing and shaping in a mold, tightening up a clamp, solidifying at low temperature, treating at high temperature, cooling and demolding. The PVC-based stone plastic composite board coated with the PMMA film prepared by the present invention can avoid the problems of large investment in production lines and equipment and high production costs involved in the production of floorboards by the conventional surface printing and surface laminating technologies, to partially replace composite floorboards, stone, acrylic panels, and curtain wall panels, etc. currently popular in the market, and provide a new path for the high additional utilization of waste.

9 Claims, No Drawings

PREPARATION METHOD FOR SURFACE MOLDING FILM OF PVC-BASED STONE PLASTIC COMPOSITE BOARD

This application claims priority to Chinese application number 201810990020.6, filed Aug. 28, 2018, with a title of PREPARATION METHOD FOR SURFACE MOLDING FILM OF PVC-BASED STONE PLASTIC COMPOSITE BOARD. The above-mentioned patent application is incorporated herein by reference in its entirety.

TECHNICAL FIELD

The present invention relates to a composite material surface treatment technology, and in particular, to a preparation method for a surface molding film of a PVC-based stone plastic composite board, and belongs to the field of stone plastic composite materials.

BACKGROUND

In the market, the stone plastic composite boards are mainly PVC-based stone plastic composite boards. The surface printing and surface laminating technologies are often used to produce home decoration floorboards, and the film layer cannot be ground and polished and is easy to fall off. These technologies are long in process involved in the production line, complicated in procedures, high in equipment requirements, large in equipment investment, and high in production costs, and the produced products are mainly concentrated in the field of floorboards.

SUMMARY

To solve the foregoing defects existing in the prior art, an objective of the present invention is to provide a PMMA decorative layer on a PVC-based stone plastic composite board through mold forming, which provides a forming technology for the surface treatment of PVC-based stone plastic composite boards. This technology is low in production equipment investment, simple in process and excellent in adhesion, and the film layer can be arbitrarily ground and polished, so as to partially replace composite floorboards, stone, acrylic panels, and curtain wall panels, etc. currently popular in the market.

The invention is implemented through the following technical solution.

A preparation method for a surface molding film of a PVC-based stone plastic composite board includes the following steps:

Surface Activation Treatment of the PVC-Based Stone Plastic Composite Board:

1a) preparation of an activated putty: waste plastic powder and methyl methacrylate are dissolved in a mass ratio of (0.2-0.5):1 to form a homogeneous solution A with the total mass of W, and magnesium hydroxide, titanium dioxide, acrylic acid, benzoyl peroxide, an organic tertiary amine compound, and oxidized polyethylene wax powder are added into the solution A, stirred in an ice-water bath to form a high-viscosity putty, activated and cooled, and then placed in a refrigerator for storage;

1b) coarse roughening of a substrate surface: a surface of the PVC-based stone plastic composite board is coarsely ground and dedusted with an abrasive paper;

1c) application of the activated putty: a wet layer of activated putty of less than 300 μm is applied to the surface of the PVC-based stone plastic composite board by scraping or spraying; and 1d) fine roughening of the substrate surface: the substrate obtained in step 1c) stands at room temperature for solidification, and is coarsely ground and dedusted with the abrasive paper to obtain a surface-activated PVC-based stone-plastic composite board;

Preparation of a PMMA Slurry the methyl methacrylate is used as an active solvent to dissolve PMMA molding powder with the total mass of N, and the organic tertiary amine compound, the benzoyl peroxide, the oxidized polyethylene wax powder, the magnesium hydroxide, and a reflective pigment are added, stirred to form a highly dispersed high-viscosity slurry, pre-polymerized and cooled, and then placed in the refrigerator for storage;

3) Surface Film Forming of the PVC-Based Stone Plastic Composite Board the PMMA slurry is scrapped on the surface of the PVC-based stone plastic composite board, placed in a tempered glass mold, cold-pressed and shaped, and solidified, treated in high temperature, cooled and demolded to obtain a PVC-based stone plastic composite board coated with a PMMA film.

Preferably, the waste plastic powder is a mixture powder of one or more of waste polymethyl methacrylate, polystyrene, a styrene-acrylonitrile copolymer, and an ethylene-vinyl acetate copolymer.

Preferably, in steps 1)-1a), (0.4-0.6) W of magnesium hydroxide, (0.02-0.05) W of titanium dioxide, (0.01-0.05) of W of acrylic acid, (0.0012-0.0024) W of benzoyl peroxide, (0.0008-0.0016) W of organic tertiary amine compound, and (0.02-0.04) W of oxidized polyethylene wax powder are added to the solution A according to the mass ratio.

Preferably, the organic tertiary amine compound is one or more of N,N-dimethylaniline, N,N-dihydroxyethyl-p-toluidine, and N,N-dihydroxypropyl-p-toluidine.

Preferably, the PVC-based stone plastic composite board is produced by Shaanxi Linsen Engineering Co., Ltd Preferably, in step 2), the methyl methacrylate and the PMMA molding powder are mixed at a mass ratio of 1:(0.1-0.4).

Preferably, in step 2), (0.0008-0.0016) N of organic tertiary amine compound, (0.0012-0.0024) N of benzoyl peroxide, (0.02-0.04) N of oxidized polyethylene wax powder, (0.4-0.6) N of magnesium hydroxide, and (0.02-0.05) N of reflective pigment are added to a mixture of the methyl methacrylate and the PMMA molding powder with the total mass of N according to the mass ratio.

Preferably, the reflective pigment is a mixture of one or more of titanium dioxide and an infrared reflective inorganic pigment, an infrared reflective inorganic pigment, and an infrared reflective inorganic pigment.

Preferably, in steps 1a) and 2), the high-viscosity putty and the high-viscosity slurry are activated at 40-50° C. and pre-polymerized for 10-20 min.

Preferably, in step 1d), the substrate stands at room temperature to solidify for 1-2 h.

Preferably, in step 3), the mixture is solidified at 25-35° C. for 2-4 h, and treated at 100-120° C. for 1-2 h.

By means of the foregoing technical solution, the present invention has the following advantageous effects:

compared with the prior art, the PVC-based stone plastic composite board coated with a PMMA film prepared by the present invention can avoid the problems of large investment in production lines and equipment and high production costs involved in the production of floorboards by the conventional surface printing and surface laminating technologies, to partially replace composite floorboards, stone, acrylic panels, and curtain wall panels, etc. currently popular in the market, and provide a new path for the high additional utilization of waste. The technical process is simple and the equipment investment is low.

DETAILED DESCRIPTION

The present invention is described in detail below with reference to the accompanying drawings and specific embodiments. Exemplary embodiments and description of the present invention are intended to explain the present invention herein, but are not intended to limit the present invention.

The present invention provides a preparation method for a surface molding film of a PVC-based stone plastic composite board, including the following steps:

1) Surface Activation Treatment of the PVC-Based Stone Plastic Composite Board:

1a) preparation of activated putty: the present invention uses waste plastic powder, i.e., a mixture powder of one or more of waste polymethyl methacrylate, polystyrene, a styrene-acrylonitrile copolymer, and an ethylene-vinyl acetate copolymer, as one of raw materials; the waste plastic powder and methyl methacrylate are dissolved in a mass ratio of (0.2-0.5):1 to form a homogeneous solution A with the total mass of W, and (0.4-0.6) W of magnesium hydroxide, (0.02-0.05) W of titanium dioxide, (0.01-0.05) of W of acrylic acid, (0.0012-0.0024) W of benzoyl peroxide, (0.0008-0.0016) W of organic tertiary amine compound, and (0.02-0.04) W of oxidized polyethylene wax powder are added to the solution A, stirred in an ice-water bath to form a high-viscosity putty, then placed at 40-50° C. for activation and pre-polymerization for 10-20 min, cooled and placed in a refrigerator for storage;

where the organic tertiary amine compound is one or more of N,N-dimethylaniline, N,N-dihydroxyethyl-p-toluidine, or N,N-dihydroxypropyl-p-toluidine. The PVC-based stone plastic composite board is produced by Shaanxi Linsen Engineering Co., Ltd.

1b) coarse roughening of a substrate surface: the surface of the PVC-based stone plastic composite board is coarsely ground and dedusted with an abrasive paper of 300-180 mesh;

1c) application of the activated putty: a wet layer of activated putty of less than 300 μm is applied to the surface of the PVC-based stone plastic composite board by scraping or spraying; and 1d) fine roughening of the substrate surface: the substrate obtained in step 1c) stands at room temperature to solidify for 1-2 h, and is coarsely ground and dedusted with the abrasive paper of 300-180 mesh to obtain a surface-activated PVC-based stone-plastic composite board;

2) Preparation of a PMMA Slurry the methyl methacrylate is used as an active solvent to dissolve PMMA molding powder (where the methyl methacrylate and the PMMA molding powder are mixed in a mass ratio of 1:(0.1-0.4) to obtain a mixture with the total mass of N), and (0.0008-0.0016) N of organic tertiary amine compound, (0.0012-0.0024) N of benzoyl peroxide, (0.02-0.04) N of oxidized polyethylene wax powder, (0.4-0.6) N of magnesium hydroxide, and (0.02-0.05) N of reflective pigment are added to the mixture according to the mass ratio, stirred to form a highly dispersed high-viscosity slurry, then placed at 40-50° C. for pre-polymerization for 10-20 min, cooled and placed in the refrigerator for storage;

where the reflective pigment is a mixture of one or more of titanium dioxide and a homemade infrared reflective inorganic pigment (ZL201510890065.2), a homemade infrared reflective inorganic pigment (ZL201310256735.6), and a homemade infrared reflective inorganic pigment (ZL201010604669.3).

3) Surface Film Forming of the PVC-Based Stone Plastic Composite Board the PMMA slurry is scrapped on the surface of the PVC-based stone plastic composite board, placed in a tempered glass mold, cold-pressed and shaped, and solidified at 25-35° C. for 2-4 h, treated at 100-120° C. for 1-2 h, cooled and demolded to obtain a PVC-based stone plastic composite board coated with a PMMA film.

The following provides specific embodiments to further describe the present invention.

Embodiment 1

1) Surface Activation Treatment of the PVC-Based Stone Plastic Composite Board:

preparation of an activated putty: the waste plastic powder, i.e., polymethyl methacrylate and methyl methacrylate are dissolved in a mass ratio of 0.2:1 to form a homogeneous solution A with the total mass of W, and 0.6 W of magnesium hydroxide, 0.02 W of titanium dioxide, 0.01 W of acrylic acid, 0.0012 W of benzoyl peroxide, 0.0008 W of N,N-dimethylaniline, and 0.04 W of oxidized polyethylene wax powder are added into the solution A, stirred in an ice-water bath to form a high-viscosity putty, then placed at 50° C. for activation and pre-polymerization for 10 min, cooled and placed in a refrigerator for storage;

coarse roughening of a substrate surface: the surface of the PVC-based stone plastic composite board is coarsely ground and dedusted with an abrasive paper of 180 mesh;

application of the activated putty: a wet layer of activated putty of less than 300 μm is applied to the surface of the PVC-based stone plastic composite board by scraping; and fine roughening of the substrate surface: the obtained substrate stands at room temperature to solidify for 1 h, and is coarsely ground and dedusted with the abrasive paper of 180 mesh to obtain a surface-activated PVC-based stone-plastic composite board.

2) Preparation of a PMMA Slurry

The methyl methacrylate and the PMMA molding powder are mixed in a mass ratio of 1:0.2 into a mixed solution with the total mass of N, and 0.0012 N of N,N-dimethylaniline, 0.0012 W of benzoyl peroxide, 0.02 W of oxidized polyethylene wax powder, 0.6 W of magnesium hydroxide, and 0.02 W of reflective pigment formed by mixing titanium dioxide and the infrared reflective inorganic pigment (ZL201510890065.2) are added in the mixed solution according to the mass ratio, stirred to form a highly dispersed high-viscosity slurry, then placed at 40° C. for pre-polymerization for 20 min, cooled and placed in the refrigerator for storage.

3) Surface Film Forming of the PVC-Based Stone Plastic Composite Board

The PMMA slurry is scrapped on the surface of the PVC-based stone plastic composite board, placed in a tempered glass mold, cold-pressed and shaped, and solidified at 25° C. for 4 h, treated at 100° C. for 2 h, cooled and demolded to obtain a PVC-based stone plastic composite board coated with a PMMA film.

Embodiment 2

1) Surface Activation Treatment of the PVC-Based Stone Plastic Composite Board:

preparation of an activated putty: the waste plastic powder, i.e., polystyrene and a styrene-acrylonitrile copolymer, and methyl methacrylate are dissolved in a mass ratio of 0.5:1 to form a homogeneous solution A with the total mass of W, and 0.4 W of magnesium hydroxide, 0.03 W of titanium dioxide, 0.05 W of acrylic acid, 0.0024 W of benzoyl peroxide, 0.0010 W of N,N-dihydroxyethyl-p-toluidine, and 0.02 W of oxidized polyethylene wax powder are added into the solution A, stirred in an ice-water bath to form a high-viscosity putty, then placed at 40° C. for activation and pre-polymerization for 20 min, cooled and placed in a refrigerator for storage;

coarse roughening of a substrate surface: the surface of the PVC-based stone plastic composite board is coarsely ground and dedusted with an abrasive paper of 300 mesh;

application of the activated putty: a wet layer of activated putty of less than 300 μm is applied to the surface of the PVC-based stone plastic composite board by scraping; and fine roughening of the substrate surface: the obtained substrate stands at room temperature to solidify for 1 h, and is coarsely ground and dedusted with the abrasive paper of 300 mesh to obtain a surface-activated PVC-based stone-plastic composite board.

2) Preparation of a PMMA Slurry

The methyl methacrylate and the PMMA molding powder are mixed in a mass ratio of 1:0.4 into a mixed solution with the total mass of N, and 0.0008 N of N,N-dimethylaniline, 0.0024 W of benzoyl peroxide, 0.03 W of oxidized polyethylene wax powder, 0.4 W of magnesium hydroxide, and 0.05 W of reflective pigment formed by mixing titanium dioxide and the infrared reflective inorganic pigment (ZL201310256735.6) are added in the mixed solution according to the mass ratio, stirred to form a highly dispersed high-viscosity slurry, then placed at 50° C. for pre-polymerization for 10 min, cooled and placed in the refrigerator for storage.

3) Surface Film Forming of the PVC-Based Stone Plastic Composite Board

The PMMA slurry is scrapped on the surface of the PVC-based stone plastic composite board, placed in a tempered glass mold, cold-pressed and shaped, and solidified at 35° C. for 2 h, treated at 120° C. for 1 h, cooled and demolded to obtain a PVC-based stone plastic composite board coated with a PMMA film.

Embodiment 3

1) Surface Activation Treatment of the PVC-Based Stone Plastic Composite Board:

preparation of an activated putty: the waste plastic powder, i.e., an ethylene-vinyl acetate copolymer, and methyl methacrylate are dissolved in a mass ratio of 0.4:1 to form a homogeneous solution A with the total mass of W, and 0.5 W of magnesium hydroxide, 0.05 W of titanium dioxide, 0.03 W of acrylic acid, 0.0018 W of benzoyl peroxide, 0.0016 W of N,N-dihydroxypropyl-p-toluidine, and 0.03 W of oxidized polyethylene wax powder are added into the solution A, stirred in an ice-water bath to form a high-viscosity putty, then placed at 40° C. for activation and pre-polymerization for 20 min, cooled and placed in a refrigerator for storage;

coarse roughening of a substrate surface: the surface of the PVC-based stone plastic composite board is coarsely ground and dedusted with an abrasive paper of 200 mesh;

application of the activated putty: a wet layer of activated putty of less than 300 μm is applied to the surface of the PVC-based stone plastic composite board by scraping; and fine roughening of the substrate surface: the obtained substrate stands at room temperature to solidify for 1 h, and is coarsely ground and dedusted with the abrasive paper of 200 mesh to obtain a surface-activated PVC-based stone-plastic composite board.

2) Preparation of a PMMA Slurry

The methyl methacrylate and the PMMA molding powder are mixed in a mass ratio of 1:0.1 into a mixed solution with the total mass of N, and 0.0016 N of N,N-dihydroxypropyl-p-toluidine, 0.0020 W of benzoyl peroxide, 0.04 W of oxidized polyethylene wax powder, 0.5 W of magnesium hydroxide, and 0.04 W of reflective pigment are added in the mixed solution according to the mass ratio, stirred to form a highly dispersed high-viscosity slurry, then placed at 45° C. for pre-polymerization for 20 min, cooled and placed in the refrigerator for storage.

3) Surface Film Forming of the PVC-Based Stone Plastic Composite Board

The PMMA slurry is scrapped on the surface of the PVC-based stone plastic composite board, placed in a tempered glass mold, cold-pressed and shaped, and solidified at 35° C. for 2 h, treated at 110° C. for 2 h, cooled and demolded to obtain a PVC-based stone plastic composite board coated with a PMMA film.

After the surface of the PVC-based stone plastic composite board is molded with a film, the present invention has the Shore hardness of more than 88 HD, the wear resistance (g/100r) of less than 0.11, the adhesion force of level 0, the glossiness of greater than 90°, and a contact angle of greater 80° without cracking under 50 cm impact, can be arbitrarily ground and polished, and thus can partially replace composite floorboards, stone, acrylic panels, and curtain wall panels, etc. currently popular in the market, and the additional value is high.

The present invention is not limited to the foregoing embodiments. On the basis of the technical solution disclosed in the present invention, a person skilled in the art can make some substitutions and transformations for some of the technical features according to the technical disclosure without involving an inventive effort, and such substitutions and transformations fall within the scope of protection of the present invention.

What is claimed is:

1. A preparation method for a surface molding film of a PVC-based stone plastic composite board, comprising the following steps:
   1) surface activation treatment of the PVC-based stone plastic composite board:
   1a) preparation of an activated putty: waste plastic powder and methyl methacrylate are dissolved in a mass ratio of (0.2-0.5):1 to form a homogeneous solution A with the total mass of W, and magnesium hydroxide, titanium dioxide, acrylic acid, benzoyl peroxide, an organic tertiary amine compound, and oxidized polyethylene wax powder are added into the solution A according to the mass ratio, stirred in an ice-water bath to form a high-viscosity putty, activated and cooled, and then placed in a refrigerator for storage;
   1b) coarse roughening of a substrate surface: a surface of the PVC-based stone plastic composite board is coarsely ground and dedusted with an abrasive paper;
   1c) application of the activated putty: a wet layer of activated putty of less than 300 μm is applied to the surface of the PVC-based stone plastic composite board by scraping or spraying; and
   1d) fine roughening of the substrate surface: the substrate obtained in step 1c) stands at room temperature for solidification, and is coarsely ground and dedusted with the abrasive paper to obtain a surface-activated PVC-based stone-plastic composite board;

2) preparation of a PMMA slurry the methyl methacrylate is used as an active solvent to dissolve PMMA molding powder with the total mass of N, and the organic tertiary amine compound, the benzoyl peroxide, the oxidized polyethylene wax powder, the magnesium hydroxide, and a reflective pigment are added, stirred to form a highly dispersed high-viscosity slurry, pre-polymerized and cooled, and then placed in the refrigerator for storage;

3) surface film forming of the PVC-based stone plastic composite board the PMMA slurry is scrapped on the surface of the PVC-based stone plastic composite board, placed in a tempered glass mold, cold-pressed and shaped, and solidified, treated in high temperature, cooled and demolded to obtain a PVC-based stone plastic composite board coated with a PMMA film.

2. The preparation method for a surface molding film of a PVC-based stone plastic composite board according to claim 1, wherein the waste plastic powder is a mixture powder of one or more of waste polymethyl methacrylate, polystyrene, a styrene-acrylonitrile copolymer, and an ethylene-vinyl acetate copolymer.

3. The preparation method for a surface molding film of a PVC-based stone plastic composite board according to claim 1, wherein in steps 1)-1a), (0.4-0.6) W of magnesium hydroxide, (0.02-0.05) W of titanium dioxide, (0.01-0.05) of W of acrylic acid, (0.0012-0.0024) W of benzoyl peroxide, (0.0008-0.0016) W of organic tertiary amine compound, and (0.02-0.04) W of oxidized polyethylene wax powder are added to the solution A according to the mass ratio.

4. The preparation method for a surface molding film of a PVC-based stone plastic composite board according to claim 3, wherein the organic tertiary amine compound is one or more of N,N-dimethylaniline, N,N-dihydroxyethyl-p-toluidine, and N,N-dihydroxypropyl-p-toluidine.

5. The preparation method for a surface molding film of a PVC-based stone plastic composite board according to claim 1, wherein in step 2), the methyl methacrylate and the PMMA molding powder are mixed at a mass ratio of 1:(0.1-0.4); and (0.0008-0.0016) N of organic tertiary amine compound, (0.0012-0.0024) N of benzoyl peroxide, (0.02-0.04) N of oxidized polyethylene wax powder, (0.4-0.6) N of magnesium hydroxide, and (0.02-0.05) N of reflective pigment are added to a mixture of the methyl methacrylate and the PMMA molding powder with the total mass of N according to the mass ratio.

6. The preparation method for a surface molding film of a PVC-based stone plastic composite board according to claim 5, wherein the reflective pigment is a mixture of one or more of titanium dioxide and an infrared reflective inorganic pigment, an infrared reflective inorganic pigment, and an infrared reflective inorganic pigment.

7. The preparation method for a surface molding film of a PVC-based stone plastic composite board according to claim 1, wherein in steps 1a) and 2), the high-viscosity putty and the high-viscosity slurry are activated at 40-50° C. and pre-polymerized for 10-20 min.

8. The preparation method for a surface molding film of a PVC-based stone plastic composite board according to claim 1, wherein in step 1d), the substrate stands at room temperature to solidify for 1-2 h.

9. The preparation method for a surface molding film of a PVC-based stone plastic composite board according to claim 1, wherein in step 3), the mixture is solidified at 25-35° C. for 2-4 h, and treated at 100-120° C. for 1-2 h.

* * * * *